(12) United States Patent
Malynin et al.

(10) Patent No.: US 12,079,716 B2
(45) Date of Patent: Sep. 3, 2024

(54) METHOD AND SYSTEM FOR OPTIMIZING RESULTS OF A FUNCTION IN A KNOWLEDGE GRAPH USING NEURAL NETWORKS

(71) Applicant: INTUIT INC., Mountain View, CA (US)

(72) Inventors: Pavlo Malynin, Menlo Park, CA (US); Gregory Kenneth Coulombe, Sherwood Park (CA); Sricharan Kallur Palli Kumar, Mountain View, CA (US); Cynthia Joann Osmon, Sunnyvale, CA (US); Roger C. Meike, Redwood City, CA (US)

(73) Assignee: INTUIT INC., Mountain View, CA (US)

( * ) Notice: Subject to any disclaimer, the term of this patent is extended or adjusted under 35 U.S.C. 154(b) by 695 days.

(21) Appl. No.: 16/805,242

(22) Filed: Feb. 28, 2020

(65) Prior Publication Data

US 2021/0271965 A1 Sep. 2, 2021

(51) Int. Cl.
*G06F 40/30* (2020.01)
*G06N 3/042* (2023.01)
*G06N 3/047* (2023.01)
*G06N 3/08* (2023.01)

(52) U.S. Cl.
CPC ............... *G06N 3/08* (2013.01); *G06N 3/042* (2023.01); *G06N 3/047* (2023.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| | | | |
|---|---|---|---|
| 11,030,484 B2* | 6/2021 | Walters | G06F 18/214 |
| 2009/0327195 A1* | 12/2009 | Iscen | G06N 5/042 |
| | | | 706/50 |
| 2018/0018558 A1* | 1/2018 | Lee | G06N 3/049 |
| 2018/0122509 A1* | 5/2018 | Christiansson | G16H 50/30 |
| 2018/0189634 A1* | 7/2018 | Abdelaziz | G06N 3/04 |
| 2018/0336461 A1* | 11/2018 | Seide | G06N 3/105 |
| 2019/0095806 A1* | 3/2019 | Martinez Canedo | G06F 18/21 |
| 2020/0110623 A1* | 4/2020 | Vangala | G06Q 10/06 |
| 2020/0257850 A1* | 8/2020 | Carbune | G06F 40/30 |
| 2021/0027178 A1* | 1/2021 | Ding | G06F 16/9535 |

(Continued)

*Primary Examiner* — Lamont M Spooner
(74) *Attorney, Agent, or Firm* — Patterson + Sheridan, LLP (57) ABSTRACT

Certain aspects of the present disclosure provide techniques for optimizing results generated by functions executed using a rule-based knowledge graph. The method generally includes generating a neural network based on a knowledge graph and inputs for performing a function using the knowledge graph. Inputs for the function are received and used to generate a result of the function. A request to optimize the generated result of the function is received. A loss function is generated for the neural network. Generally, the loss function identifies a desired optimization for the function. Values of parameters in the neural network are adjusted to optimize the generated result based on the generated loss function, and the adjusted values of the parameters in the neural network are output in response to the request to optimize the generated result of the function.

20 Claims, 6 Drawing Sheets

(56) References Cited

U.S. PATENT DOCUMENTS

| | | | |
|---|---|---|---|
| 2021/0034500 A1* | 2/2021 | Budnik | G06N 3/08 |
| 2021/0081717 A1* | 3/2021 | Creed | G06N 5/022 |
| 2021/0103706 A1* | 4/2021 | Yu | G06F 40/44 |
| 2021/0128115 A1* | 5/2021 | Mapiye | A61B 5/4833 |
| 2021/0166071 A1* | 6/2021 | Park | G06N 3/045 |
| 2021/0174217 A1* | 6/2021 | Pai | G06N 3/08 |
| 2021/0192134 A1* | 6/2021 | Yue | G06F 16/3326 |
| 2021/0192364 A1* | 6/2021 | Wang | G06F 18/2413 |
| 2021/0192372 A1* | 6/2021 | Kang | G06F 16/2282 |
| 2021/0216577 A1* | 7/2021 | Xiao | G06F 16/3329 |
| 2021/0264244 A1* | 8/2021 | Xian | G06F 16/221 |
| 2021/0279599 A1* | 9/2021 | Carbune | G06N 5/022 |
| 2021/0374615 A1* | 12/2021 | Drummond | G10L 15/26 |
| 2022/0092416 A1* | 3/2022 | Houlsby | G06N 3/08 |

* cited by examiner

FIG. 1

```
Exempt False
              Week 1     Week 2
Monday        12         0
Tuesday       12         0
Wednesday     12         0
Thursday      12         0
Friday        12         0
Saturday      0          0
Sunday        0          0

> how much overtime do I have in the first week?
>>> using node /Payroll/Hours2Weeks/
OvertimeHoursWeek1
My records show 20.0
```

```
> optimize that
How does this look?
Exempt False
              Week 1     Week 2
Monday        6.6        6.2
Tuesday       6.6        6.2
Wednesday     6.6        6.2
Thursday      6.6        6.2
Friday        6.6        6.2
Saturday      1.7        6.2
Sunday        1.7        6.2

> how much overtime do I have in the first week?
>>> using node /Payroll/Hours2Weeks/
OvertimeHoursWeek1
My records show 0.0
```

METHOD AND SYSTEM FOR OPTIMIZING RESULTS OF A FUNCTION IN A KNOWLEDGE GRAPH USING NEURAL NETWORKS

Aspects of the present disclosure relate to performing functions in an application using a knowledge graph, and more specifically to optimizing results generated by the functions in the application using neural networks.

BACKGROUND

Graph structures generally represent relationships between data and operations as connections between nodes in a graph, where the nodes represent data provided by a user of an application and/or operations performed by an application. These graph structures may be established as directed graphs, in which nodes representing inputs to a given node are connected to the given node using directional constructs, such as unidirectional arrows or connections that point from a source node to the given node. Because graphs can be used to define input and output relationships for a function in an application, graphs may be a useful mechanism by which an application can be defined.

In some cases, an application may be defined using a knowledge graph structure. In a knowledge graph structure, nodes in the knowledge graph may encode various rules for performing an operation. For example, a node may include rules that define required and optional inputs for a function and specify the output generated based on the required and optional inputs. Further, in the knowledge graph, nodes may be connected in a continuous path from a root node, which may represent the entry point into an operation or a series of related operations in an application, to a terminating node representing the final actions to be performed for and the results generated from executing the operation or series of related operations.

Because knowledge graphs are generally structured so that a result can be calculated for a given set of inputs, knowledge graphs can be used to describe and implement forward queries for a set of rules defined in the knowledge graphs. For example, in an accounting system implemented using a knowledge graph, these forward queries may allow a user to request information about an amount due or owed, based on a given input set of data, such as an amount of overtime a user has worked, and other data that can be calculated using the knowledge graph. However, performing backwards queries against the knowledge graph to adjust input values and a generated result of a function defined in the knowledge graph may be difficult.

Accordingly, techniques are needed to allow for optimization of results generated by functions in a knowledge graph.

BRIEF SUMMARY

Certain embodiments provide a computer-implemented method for optimizing results generated by functions executed using a rule-based knowledge graph. The method generally includes generating a neural network based on a knowledge graph and inputs specified by nodes in the knowledge graph for performing a function using the knowledge graph. Inputs are received for performing the function using the knowledge graph, and a result of the function is generated based on the received inputs and the knowledge graph. A request to optimize the generated result of the function is received. A loss function is generated for the neural network. Generally, the loss function identifies a desired optimization for the function based on the request to optimize the generated result of the function, and is generated by performing a backpropagation operation on the neural network. Values of the received inputs are adjusted to optimize the generated result based on the generated loss function, and the adjusted values of the received inputs are output in response to the request to optimize the generated result of the function.

Other embodiments provide a system comprising a processor and a non-transitory computer-readable memory storing instructions that, when executed by the processor, perform an operation for optimizing results generated by functions executed using a rule-based knowledge graph. The operation generally includes generating a neural network based on a knowledge graph and inputs specified by nodes in the knowledge graph for performing a function using the knowledge graph. Inputs are received for performing the function using the knowledge graph, and a result of the function is generated based on the received inputs and the knowledge graph. A request to optimize the generated result of the function is received. A loss function is generated for the neural network. Generally, the loss function identifies a desired optimization for the function based on the request to optimize the generated result of the function, and is generated by performing a backpropagation operation on the neural network. Values of the received inputs are adjusted to optimize the generated result based on the generated loss function, and the adjusted values of the received inputs are output in response to the request to optimize the generated result of the function.

Still further embodiments provide a computer-readable medium having instructions stored thereon which, when executed, performs an operation for optimizing results generated by functions executed using a rule-based knowledge graph. The operation generally includes generating a neural network based on a knowledge graph and inputs specified by nodes in the knowledge graph for performing a function using the knowledge graph. Inputs are received for performing the function using the knowledge graph, and a result of the function is generated based on the received inputs and the knowledge graph. A request to optimize the generated result of the function is received. A loss function is generated for the neural network. Generally, the loss function identifies a desired optimization for the function based on the request to optimize the generated result of the function, and is generated by performing a backpropagation operation on the neural network. Values of the received inputs are adjusted to optimize the generated result based on the generated loss function, and the adjusted values of the received inputs are output in response to the request to optimize the generated result of the function.

The following description and the related drawings set forth in detail certain illustrative features of one or more embodiments.

BRIEF DESCRIPTION OF THE DRAWINGS

The appended FIGURES depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Knowledge graphs provide a way to describe operations in an application based on the inputs used by an operation and the rules implemented by the operation in order to generate an output. For example, in an accounting application, a knowledge graph may define an operation for tracking accounts payable as a series of connected nodes encoding rules that, when executed, results in a summation of amounts in unpaid invoices received during a given time period. In another example, in a time tracking application, a knowledge graph may define an operation for tracking overtime for any given week as a series of connected nodes encoding rules that, when executed, results in a summation of hours worked for each day of a week, less an amount of time expected to be worked during that week. Because knowledge graphs describe operations in terms of inputs and rules applied to those inputs (and any intermediate calculations) to generate a result, knowledge graphs may be used in various applications to allow users to request the result of an operation, given some set of inputs.

However, users may wish to optimize the results of an operation, given the set of inputs as a situation defining a base case. However, it may be computationally difficult for to determine how to optimize the results of an operation. For example, using the time tracking example discussed above, calculating an amount of overtime a user has worked during a given week may be a computationally simple task, since the input data already exists for a system to perform such a calculation. However, optimizing the amount of overtime the user works during in a future time period may be much more computationally difficult, since there may be any number of end states that would result in an optimized result and any number of constraints that may influence an optimized result.

To optimize the results of an operation, optimization functions may be hard coded into an application. These optimization functions may, for example, use linear functions or other linear programming techniques to optimize the results generated for a specific function in a knowledge graph. However, many functions are unable to be described by a linear function, and thus, may not be optimized using linear functions. In some cases, functions can be optimized directly using a variety of hard-coded, predefined methods. However, these hard-coded, predefined methods may be hard to maintain and slow to execute, resulting in runtime durations and result accuracy that is not acceptable in a user-facing environment.

Aspects of the present disclosure provide for the optimization of functions defined in a rule-based knowledge graph using neural networks and back propagation techniques. A knowledge graph may be transformed into a neural network that generates a result, and optimizations may be performed in the neural network on parameters used in generating a result. By transforming knowledge graphs into neural networks that are used in optimizing the results of a function, various functions of varying complexity may be optimized without using a priori defined or otherwise explicitly coded optimizations. Further, functions represented by a knowledge graph and transformed into a neural network may be optimized because neural networks allow for non-linear problems to be solved through non-linear activation functions, which allows complicated functions that are unable to be described using linear functions may be optimized dynamically. Still further, transforming knowledge graphs into neural networks may allow for conversational systems to identify optimizations to be performed on parameters used in performing a function in the knowledge graph.

Figure 1:
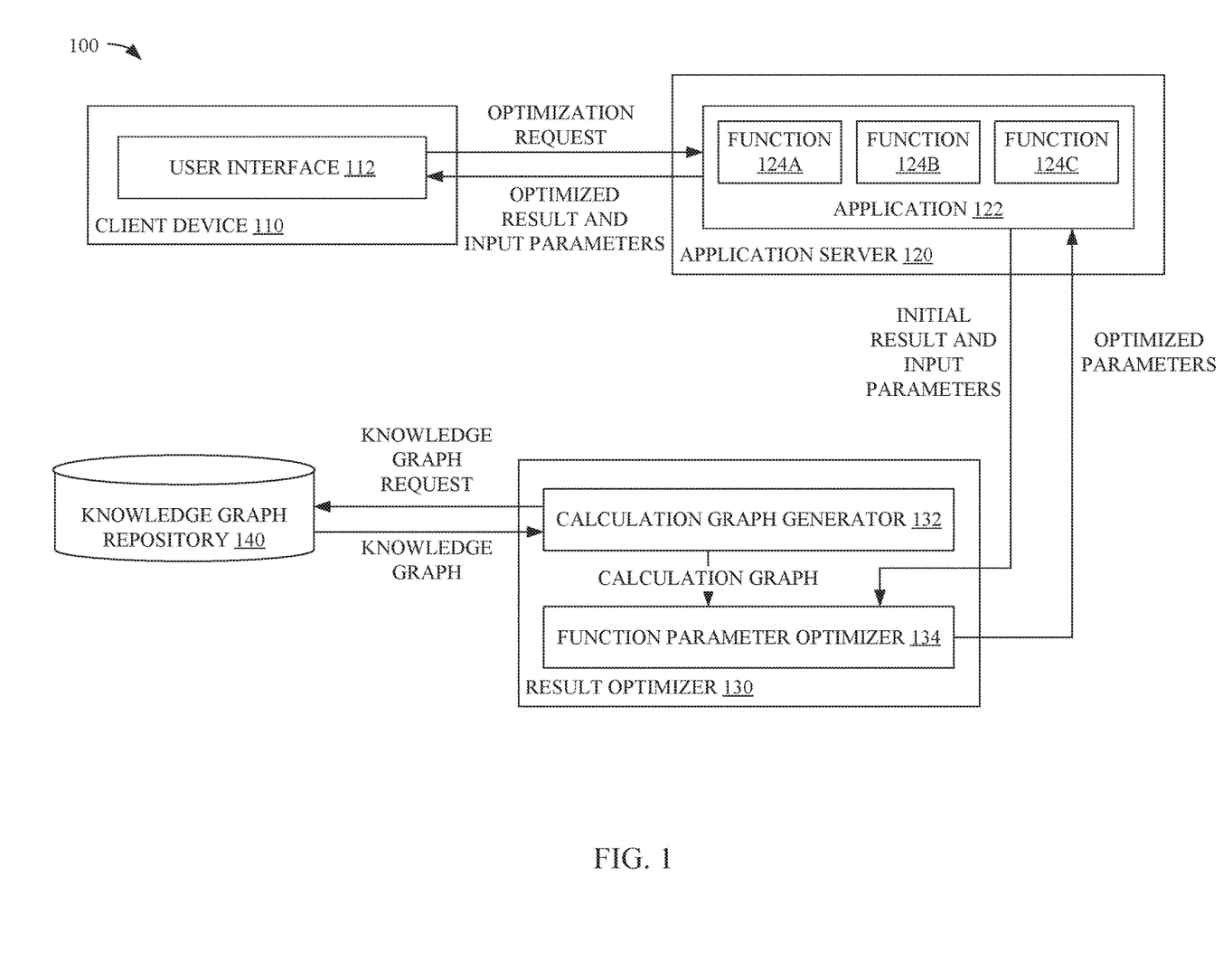
FIG. 1 depicts an example computing environment in which a neural network is used to optimize parameters used to generate a result of a function executed using a rule-based knowledge graph.

Example Optimization of Parameters Used to Generate a Result for a Function in a Knowledge Graph Using Neural Networks FIG. 1 illustrates an example computing environment 100 in which neural networks are used to optimize parameters used to generate results for a function in a rule-based knowledge graph. Generally, the optimization of the parameters used to generate a result for a function may include adjusting the inputs provided to the function to achieve a defined target state for the results of the function. Generally, the defined target state may be an optimization given an identification of optimizable parameters and fixed constraints that may influence the values of the optimizable parameters For example, an optimization in a time tracking application may be to minimize the number of overtime hours worked during future time period, and the optimization generated using a neural network may be a number of hours worked each day over the future time period that minimizes the number of overtime hours worked during the future time period while complying with constraints such as a maximum amount budgeted for pay, a rate at which the worker for whom the optimization is being performed is paid, and the like.

As illustrated, computing environment 100 includes a client device 110, an application server 120, a result optimizer 130, and a knowledge graph repository 140. Computing environment 100 illustrates the optimization of results generated by a function in a knowledge graph using neural networks in a client-server deployment where an application deployed on an application server, accessed remotely by a client device, requests optimization of results generated by a function implemented in application 122 on an application server 120. It should be recognized, however, that the application may be implemented as executable files installed on a client device, such as a desktop computer, laptop computer, tablet, or smartphone, to name just a few, and that such an application executing on a client device may request the optimization of a result generated by a function in an executing on a client device through result optimizer 130.

Client device 110 generally hosts a user interface 112 that receives graphical user interface data from application server 120 including one or more fields for entering data to be processed by a software application executing on application server 120 and transmits the entered data to application server 120 for processing. Generally, a user may invoke a session of application 122 executing on application server 120 by providing, through user interface 112, user login credentials for the user's account to application server 120. Subsequently, a user may use various features provided by application 122 by requesting execution of specific functions 124A-C in application 122. Generally, requesting execution of a function in application 122 may include generating a request that includes input data used to generate a result of the function. In response, application 122 may generate the result of the function using the input data included in the request and transmit the result to client device 110 for display.

To optimize the result of the function, a user may generate an optimization request through user interface 112. The optimization request may be generated, for example, as a natural language command processed by application 122, as discussed in further detail below, using an a priori defined command, or the like. The optimization request may indicate the function for which results are to be optimized (e.g., by adjusting the input values used by the function). In response, application 122 can transmit an optimized result to user interface 112 for display.

Application server 120 generally hosts various components of a software application and exposes these components for use by users of client device 110. As illustrated, application server 120 includes an application 122.

Application 122 is generally representative of any application that may be hosted on an application server 120 for execution by one or more remote users interacting with the application 122 using a client device 110. When application 122 receives a request to execute one of functions 124A-C in the application, application 122 extracts inputs for the specified function from the request or information identifying data to retrieve from a data repository associated with application 122. Using the inputs extracted from the received request or retrieved from the data repository, application 122 calculates an initial unoptimized result of the specified function and outputs the result to client device 110.

Generally, application 122 can generate the initial unoptimized result of the specified function based on rules included in a knowledge graph that defines the rules for processing the input data for the function into a generated result of the function. The knowledge graph may indicate required and optional inputs for a function, predecessor and successor functions that are related to the identified function, and the like.

The knowledge graph may define functions of varying complexity. For example, in a time tracking application, a function defined in the knowledge graph for calculating overtime worked may specify that hours worked data for each day in a given time period must be specified or, if not specified explicitly, be assumed to be 0. The function may further define an overtime calculation for any given week as the summation of the hours worked during each day in a week, less some base number of hours.

More complex examples may include functions defined in a knowledge graph that calculate an amount of tax owed given any arbitrary number of different types of income, functions that calculate a payment schedule for accounts payable having arbitrary due dates, and other calculations that can be defined in terms of a set of rules for performing the calculation. Regardless of the complexity, each function defined in the knowledge graph may generally be defined as a set of rules defining required and optional inputs needed to execute a respective function and how the output of the respective function is calculated from the required and optional inputs. Further, as each function 124 is defined as a set of rules defining inputs and outputs, the knowledge graph may allow application 122 to calculate an output from a given set of input parameters but is generally unable to suggest changes to the input parameters in a function to achieve a user-defined or a priori assumed target optimal state.

In response to outputting the generated result to client device 112 for display in user interface 112, application 122 may receive an optimization request from a user of the application 122. Generally, the optimization request may be received in response to an initial calculation of a result of a function from an initial set of input parameters to allow for various scenarios to be simulated and optimized to identify a better set of input parameters for a given scenario than the initial set of input parameters.

Application 122 may identify the optimization to perform based, for example, on information in the received optimization request and nodes in the knowledge graph identifying an optimization to perform. For example, nodes in a knowledge graph may be tagged or otherwise associated with one or more words or phrases that identify an optimization to perform with respect to the function represented by the node in the knowledge graph.

Application 122 may use natural language processing techniques to extract words of interest from the received optimization request and match the extracted words to tags associated with each node in the knowledge graph. When a match is found between the extracted words of interest from the received optimization request and a tag associated with a node in the knowledge graph, application 122 can identify an optimization to be performed. Application 122 subsequently instructs result optimizer 130 to optimize the results of the function based on the input parameters and the initial unoptimized result of the function, as discussed in further detail below. In response, application 122 receives an optimized result from result optimizer 130 and outputs the optimized result to client device 110 for display on user interface 112. As discussed in further detail below, the optimized result may include adjusted parameter values for operations defined in a function (e.g., 124A-C) that result in a result that is close to or equal to a target value that is user-defined or assumed a priori for the function.

For example, a node may be tagged with a word or phrase that identifies the result of the function associated with the node to be optimized and a desired result of the function after optimization. Application 122 may receive a natural language utterance from client device 110, identify natural language words or phrases that match a tag associated with a node in the knowledge graph, and initiate an optimization process on the function associated with the node including the identified natural language words or phrases as a tag.

In some embodiments, application 122 may maintain a cache of commands previously executed by a user of the application 122. When application 122 receives a natural language command that specifies that an optimization is to be performed, application 122 may look at the cache of commands to identify the last executed command and assume that the requested optimization is in respect of the result generated by the last executed command.

Result optimizer 130 generally creates calculation graph neural networks from a knowledge graph and uses the created calculation graph neural networks to optimize the results of a function given an initial unoptimized result and a set of input parameters. Generally, a calculation graph neural network is a graph that encodes the rules in a knowledge graph defining a function into a structure of nodes and vertices, where some nodes represent values used during execution of the function, some nodes represent values generated during execution of the function, and vertices between nodes represent input/output relationships. In some embodiments, the calculation graph neural network may have a similar structure to the knowledge graph defining a function. While the knowledge graph allows for calculation of a result through a forward pass through the knowledge graph given a set of inputs, the calculation graph allows for the generation of input parameter values for a given target result through a backward pass through the calculation graph, given one or more constraints that limit how the target result is generated. As discussed in further detail below, the calculation graph neural network may include nodes representing parameters that may constrain an optimization for the function represented by the calculation graph neural network and nodes representing parameters that may be optimized, given the constraining parameters. As illustrated, result optimizer 130 includes a calculation graph generator 132 and a function parameter optimizer 134.

Result optimizer 130 may execute on one or more computing devices and may use graphics processing units, field programmable gate arrays, or other accelerators or processors to generate calculation graph neural networks and optimize the results of a function in a knowledge graph, as discussed in further detail below.

Calculation graph generator 132 generates a calculation graph neural network from a knowledge graph or portion of a knowledge graph defining a function 124A-C in application 122 and outputs the calculation graph neural network for use by function parameter optimizer 134 in optimizing the results of a function, given a set of constraints that limit how the function is optimized (i.e., how values of input parameters are selected to achieve a target result for the function). In some embodiments, the calculation graph neural network may be a directed acyclic graph in which edges connecting nodes in the calculation graph neural network point unidirectionally from a source node to a destination node. Further, the graph may not have any cyclic edges, or edges that originate and point to the same node.

To generate the calculation graph neural network, calculation graph generator 132 examines the rules defining a function in the knowledge graph to identify operations performed to complete execution of a function and the data used by the function. Nodes in the calculation graph associated with input data may be represented by nodes in the calculation graph neural network that point to other nodes in the calculation graph neural network but are not the targets of other nodes in the graph. Nodes representing calculations or other operations performed on input data may be pointed to by the nodes representing inputs for a calculation. Nodes whose results are used by other calculations or operations may point to the nodes representing those other calculations or operations. The result of the operation may be represented by a node that does not point to any other node in the calculation graph neural network.

In some embodiments, the calculation graph neural network may be generated by examining the input parameters specified for the function in the knowledge graph and generating a set of leaf nodes associated with the input parameters. Subsequently, nodes may be created for each operation defined in the knowledge graph. Nodes representing input parameters used by an operation may be unidirectionally connected to the node representing the operation (e.g., using a directional vertex or other structure that identifies the unidirectional nature of the connection between the inputs and the operation using these inputs). Connections may be established between nodes generated for the function until calculation graph generator 132 generates a calculation graph that includes connections from the nodes representing input parameters to nodes representing operations that result in the calculation of the output of the function. In some embodiments, the nodes representing input parameters may represent nodes for which an optimization may be performed to suggest changes to the value of an input parameter of the function in the knowledge graph that results in an optimized result for the function.

Generally, in the calculation graph neural network, the nodes representing input parameters may represent nodes for which values may be optimized and/or nodes that serve as constraints on an optimization of the input parameters that may be optimized. In some embodiments, as discussed in further detail below, a request to optimize a result of a function represented by a calculation graph neural network may include information identifying the values of one or more input nodes serving as a constraint on the optimization. For example, in an scheduling function optimizer for a single worker, the input nodes may include nodes representing a number of hours worked during each day in a given time period, a node representing a maximum number of hours that can be worked before incurring overtime, a pay rate, and a maximum amount that has been allocated for paying the worker. The constraining parameters may be defined by a user, for example, as the nodes representing the maximum number of hours that can be worked before incurring overtime, the pay rate, and the maximum amount allocated for paying the worker, and a target value for the total amount of overtime pay accrued. It should be recognized, however, that the calculation graph neural network may include any number of input nodes, and any number of these input nodes may represent constraints on an optimization and the remaining input nodes in the calculation graph neural network may represent inputs that may be optimized, as discussed in further detail below.

Generally, the knowledge graph and the calculation graph neural network may have similar structures. The knowledge graph and the calculation graph neural network may include a similar number of nodes. However, while nodes in the knowledge graph may represent operations that may be performed to generate a result, nodes in the calculation graph neural network may represent values of inputs and intermediate calculations that may be performed to reach a result (represented by another node in the calculation graph neural network). The knowledge graph may be used for forward queries to generate a result given a set of input values, and the calculation graph neural network may be used for backwards queries to generate optimized input values given a set of constraints, as discussed in further detail below.

In some embodiments, the calculation graph neural network may be generated in response to a request to optimize the results of a function. When application 122 receives a request to optimize the results of a function in a knowledge graph, application 122 may initiate an optimization process by instructing calculation graph generator 132 to generate a calculation graph for the specified function in the knowledge graph.

For example, suppose a calculation graph neural network is generated to calculate a total amount of overtime worked during a week. The neural network may include input nodes representing hours worked during each day in a week and calculation nodes that add the hours worked during any given day to the summation of the hours worked in the previous days of the week. A result node may thus represent the total number of hours worked during the week. Further, the input nodes may include a default value which may be used if no value is specified for a specific day.

Function parameter optimizer 134 uses the calculation graph neural network generated from the knowledge graph defining a specified function to optimize the results of the specified function and generate an adjusted set of parameter values that optimizes the results of the function. Generally, a loss function used to optimize the results of the specified function may be determined according to a desired result to be generated by a function. The desired result may be defined explicitly by a user, in the rules defining a function in the knowledge graph, or assumed given the context of an optimization command. For example, given a natural language command to "minimize" the result generated by a function, function parameter optimizer 134 can determine that the target result of the loss function is zero or some other known minimum value of the function to be optimized; meanwhile, given a natural language command to "maximize" the result generated by a function, function parameter optimizer 134 can determine that the target result of the loss function is the largest possible value or some other known maximum value for the function to be optimized.

For example, where smaller values are known to represent more optimal results than larger values, function parameter optimizer 134 can search for a result of the function, given adjusted input values that collectively result in the same total input value as that provided by a user, that generates a smallest result. Likewise, where larger values are known to represent more optimal results than smaller values, function parameter optimizer 134 can search for a result of the function, given adjusted input values that collectively result in the same total input value as that provided by a user, that generates a largest result. In still further cases, a user may specify a target result to be achieved by the function given a set of input values, and function parameter optimizer 134 can search for adjusted input values that achieves the target result or a result that approximates the target result.

Generally, to optimize the results of the function and generate an adjusted set of parameter values that result in an optimized result for the function, function parameter optimizer 134 may generate a loss function for the calculation graph. The loss function, in some embodiments, may be represented as gradient functions associated with each edge connecting nodes in the calculation graph. The loss function generated for the calculation graph neural network may, in some embodiments, be represented as a chain rule expression over connections between individual nodes in the calculation graph neural network. In some embodiments, the loss function may be calculated using a backpropagation operation that computes the gradient of a loss function based on weights in the calculation graph neural network. The backpropagation operation may calculate the gradient of the loss function identified for the output layer of the calculation graph neural network (e.g., the node(s) representing the result of the function in the knowledge graph for which the calculation graph neural network is generated). The backpropagation operation may iterate backwards from the output layer of the calculation graph neural network through other layers of the neural network to calculate gradients of other loss functions associated with other pairings of nodes until the beginning layers of the neural network are reached. The beginning layers may represent, for example, an initial input or set of inputs from which the result of the function is generated.

To identify the adjusted parameter values that achieve an optimized result of the function, function parameter optimizer 134 can perform a stochastic gradient descent within the calculation graph neural network. A stochastic gradient descent may iteratively adjust the values of one or more parameters represented by nodes in the calculation graph neural network, given the loss function associated with each parameter in the calculation graph neural network. For each iteration, function parameter optimizer 134 can calculate a result of the function using the rules defining the function in the knowledge graph to determine whether the result of the function for the iteration of the adjusted parameters is better, or more optimized, than a result from a previous iteration and the initial unoptimized result of the function. When function parameter optimizer 134 identifies an iteration of the adjusted input values that results in a most optimized result of the function (e.g., determines that no further optimizations can be performed for the function, given the initial input values and the target state defined for the function), function parameter optimizer 134 can output the adjusted input values to application 122 for presentation to a user on client device 110. Generally, an iteration of the adjusted input values that results in a most optimized result of the function may be the adjusted input values that generate a result closest to a defined optimal result for the function. The defined optimal result may be, for example, the result closest to a desired target value for the result of the function, which may be a minimum value, a maximum value, or any other value defined for the result of the function.

In some embodiments, the loss function may be based on the chain rule. Working backwards from a node representing a result of the function (e.g., a terminal node in the calculation graph neural network associated with a result of the function defined by the knowledge graph), the loss function can define each input node in the calculation graph neural network in terms of a derivative function and a weight of connections between nodes in the calculation graph neural network. An optimized result may be achieved by calculating gradients backwards from the terminal node in the calculation graph neural network, given the constraints defined for optimizing the function, as discussed in further detail below.

In some embodiments, function parameter optimizer 134 can terminate the adjustment of input values based on other conditions. For example, function parameter optimizer 134 can terminate the adjustment of input values when a user issues an adjustment termination instruction through application 122. In another example, function parameter optimizer 134 can execute for a defined duration and terminate when a timeout procedure is reached. In still further examples, function parameter optimizer 134 can terminate when a defined amount of computing resources are used.

Figure 2:
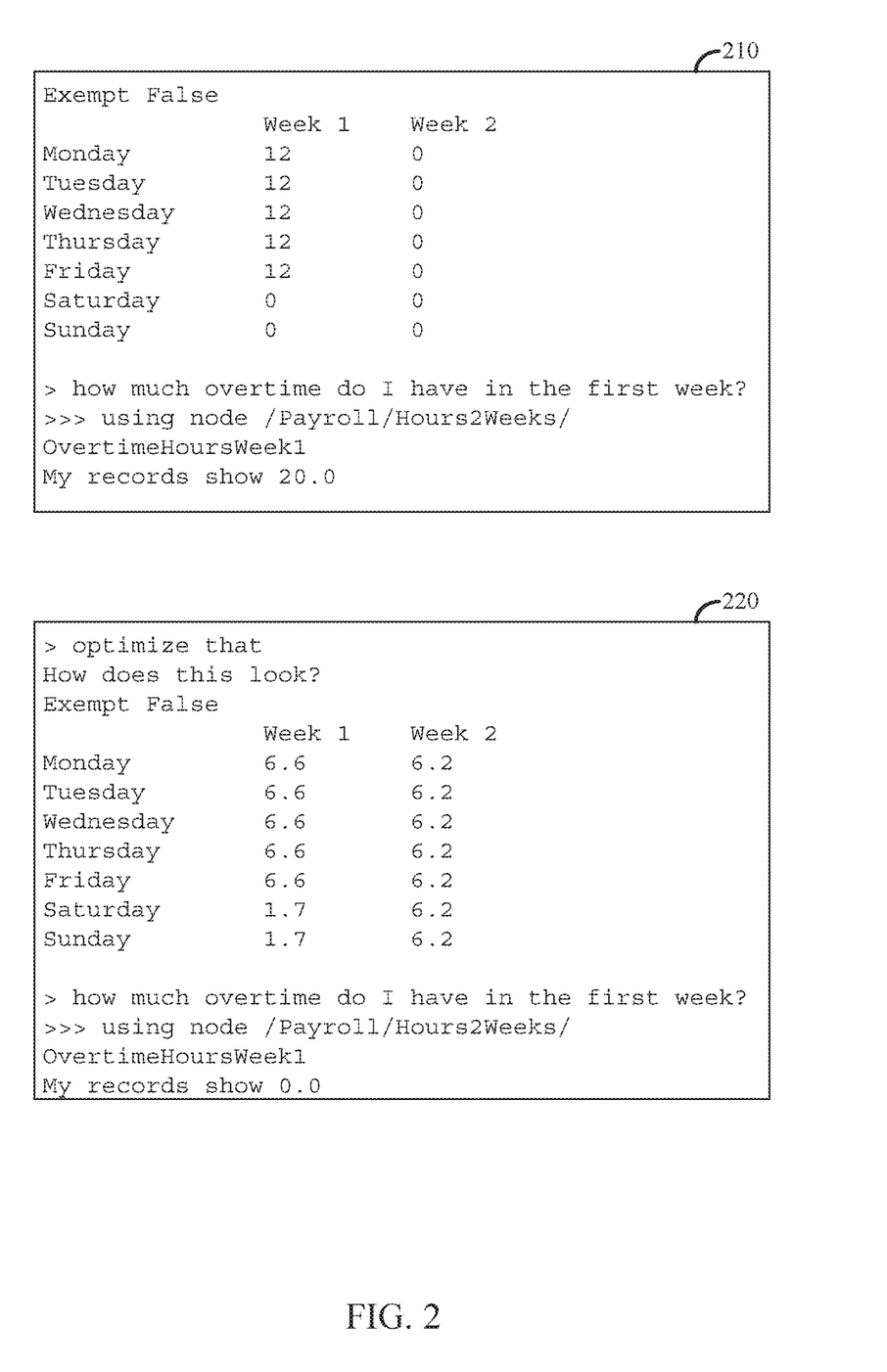
FIG. 2 illustrates an example of unoptimized and optimized parameters used to generate a result of a function in a rule-based knowledge graph.

Example Optimized Parameters to Generate an Optimized Result for a Function Defined in a Knowledge Graph FIG. 2 illustrates example output of a result optimizer (e.g., result optimizer 130 illustrated in FIG. 1) for an example workflow. The output illustrated in FIG. 2 may be generated using a calculation graph neural network generated from a knowledge graph associated with a function defined in a knowledge graph implemented in an application and an initial result and input parameters generated by the application, as discussed above. Generally, initial response 210 may represent a forward pass through rules defined in a knowledge graph for generating a result of a function, and optimized response 220 may represent a backwards pass through a corresponding calculation graph neural network for recommending a set of inputs for the function that will satisfy one or more constraints.

As illustrated, initial response 210 illustrates a scenario in which a user requests the calculation of the total amount of overtime the user has entered into a time tracking application for a given week. Specifically, the user is requesting a calculation of a number of overtime hours the user has entered for a specific period of time (e.g., the first week in a two-week window). In response, an application identifies a node or set of nodes in a knowledge graph representing the function to be executed (e.g., the node "Payroll/Hours2Weeks/OvertimeHoursWeek1"). Generally, the node or set of nodes may identify a set of operations to be performed to generate a result (e.g., in this example, to generate a result based on the data input by the user into the time tracking system and rules defining a normal workweek). In this example, the user has worked 60 hours during the first week, and based on rules defined for overtime (e.g., a maximum number of hours worked before overtime hours are counted), the system determines the number of overtime hours the user has worked during the first week.

Optimized response 220 may be generated, as illustrated, from a user instructing a result optimizer to optimize inputs used to generate a result of the function for which a result was calculated in initial response 210. While a target result of a function may be known (e.g., defined by a user), there is potentially an infinite number of permutations of input values that may achieve the target result. Further, as a function may have a large number of inputs, each of which may affect the result of a function differently, it may not be possible to manually identify the values of input parameters that will achieve a target result for the function. Thus, embodiments presented herein may use backpropagation over a neural network representing a calculation defined in a knowledge graph to identify a set of inputs that will achieve the target result, or a result approximating the target result.

In this example, a user may define a target result for the function as a solution that results in no overtime or a minimal amount of overtime being recorded over a given time period, given a number of constraints that limit how optimized response 220 is generated. The optimization may result in the generation of values for one or more input parameters that achieve the target result for the function. For example, to achieve optimized response 220, the constraints may indicate that up to 4 hours of overtime is permissible for any given week, and assuming a normal work week of 40 hours, the total amount of time worked should be equal to or less than 80 hours. It should be recognized, however, that the optimization may be defined in terms of a varying number of constraints depending on the complexity of a function to be optimized, which parameters can be optimized and which parameters are constrained, and the like. It should be noted that while initial response 210 and optimized response 220 refer to data in weeks 1 and 2, the values generated for optimized response 220 may not overwrite the values used to generate initial response 210 and already stored in memory. That is, optimized response 220 may be a recommendation for future scheduling, given the constraints discussed above, but may not override data that has already been committed to a data store and been used to generate a result through a forward pass through a knowledge graph or relevant portion thereof.

Optimized response 220 may be generated by a calculation graph neural network in which rules in a knowledge graph are transformed into a neural network from which an optimized result may be discovered through backpropagation and a stochastic gradient descent for the weights associated with nodes in the calculation graph neural network. As discussed in further detail below, the optimization of input parameters in optimized response 220 may be performed so that the input parameters, when processed through a forward pass through the knowledge graph, generates a result that approaches or matches a target value defined for the function.

In this example, the total number of hours worked in optimized response 220 may be less than or equal to a value that results in an optimized result (e.g., in this example, 3.4 hours of overtime worked during the first week and a total of less than 80 hours worked during the two-week span illustrated in optimized response 220). Further, because an optimization for a total number of overtime hours may be to include the smallest amount of overtime hours in a time period, the system can attempt to find a solution that results in no overtime, or a minimal amount, being posted for any time period of hours worked. Thus, unlike the five 12-hour days from which initial response 210 is built (leading to a total number of 20.0 overtime hours), the system may generate a response for which no overtime hours are worked during the first week or any overtime worked during the first week is offset by hours not worked during the second week.

In this example, a knowledge graph defining the overtime calculation function used to generate initial response 210 may define the function in terms of input parameters representing a number of hours worked for each day in the time period, a summation function over the inputs, and a subtraction function used to calculate the total number of overtime hours worked during the time period. An optimization, executed using the calculation graph neural network, may identify each of the per-day hours worked parameters as optimizable parameters and a number of permissible overtime hours accrued during the time period as a constraint parameter. The calculation graph neural network used to generate optimized response 220 from the definition of the overtime calculation function in the knowledge graph may thus include, for example, seven learnable nodes representing values of parameters that can be learned (e.g., adjusted) during an optimization process (i.e., one input node for each day in the week), and a number of operation nodes representing intermediate operations performed to calculate a total number of hours worked during the week. A final operation node, representing the result generated by the overtime calculation function, may subtract a predefined number of hours (i.e., the number of hours in a full work week before overtime accrues) to generate the result of the function, as defined in a knowledge graph. As discussed, when an optimization is performed using the generated calculation graph neural network, values of the parameters represented by the learnable nodes may be generated based on the loss function calculated for each node (e.g., according to the chain rule) and using a gradient descent to adjust the values of these parameters.

Figure 3:
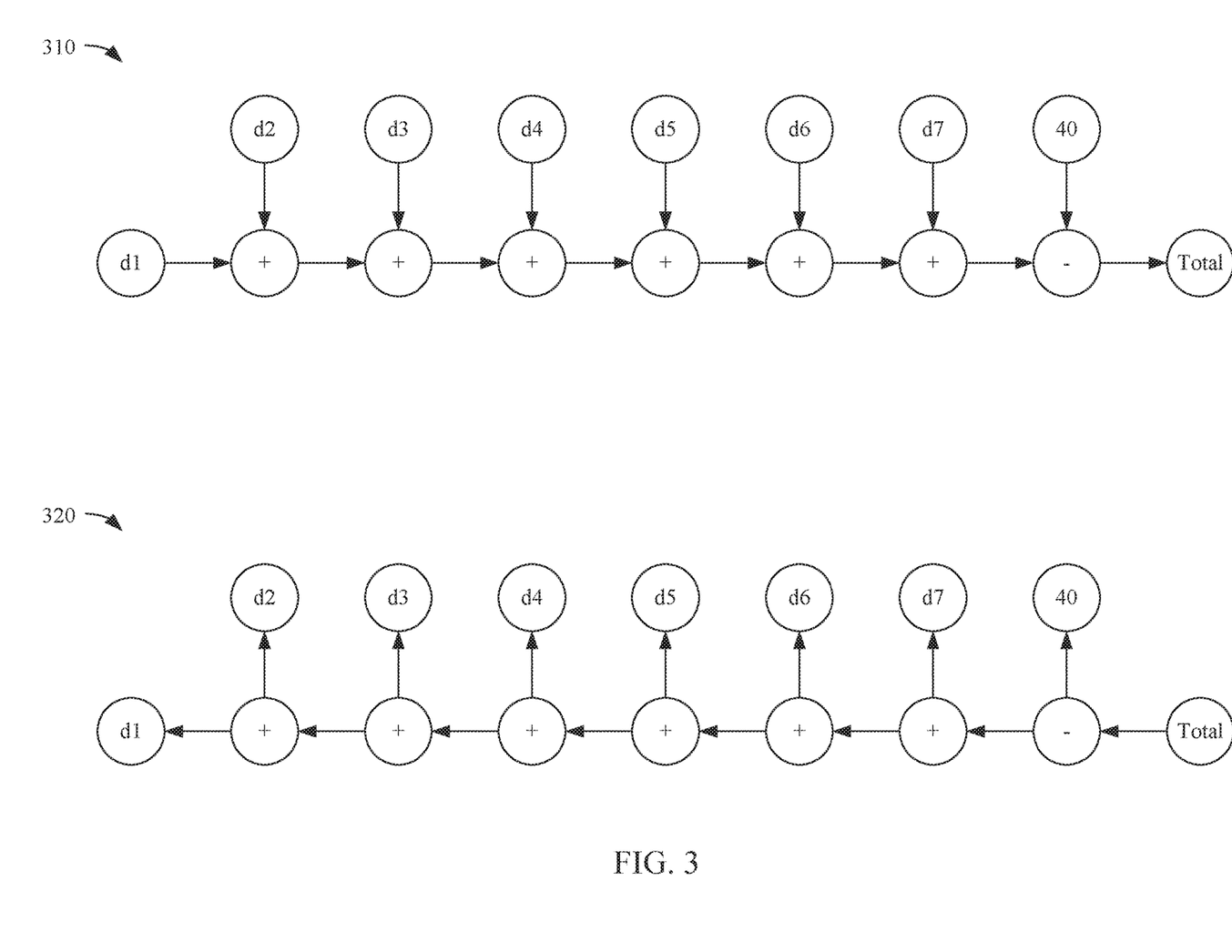
FIG. 3 illustrates an example knowledge graph and calculation graph neural network used to optimize parameters used to generate a result of a function.

Example Knowledge Graph and Computation Graph Neural Network for Generating Optimized Parameters to Optimize a Result of a Function in a Knowledge Graph FIG. 3 illustrates a knowledge graph 310 and a computation graph neural network 320 generated from the knowledge graph 310 that may optimize input parameters used to generate a result of a function in a knowledge graph using a neural network. As illustrated, knowledge graph 310 and computation graph neural network 320 illustrate graph structures defining a calculation of a number of overtime hours worked during a given week (i.e., over a 7 day period).

As illustrated, knowledge graph 310 depicts a graph definition of a calculation of a number of overtime hours worked as a summation of the hours worked for each day of a week, less 40 hours. To calculate a result, values may be provided to knowledge graph 310 for input parameters d1, d2, d3, d4, d5, d6, and d7. Using these input parameters and knowledge graph 310, a first intermediate result may be generated as the sum of input parameters d1 and d2; a second intermediate result may be generated as the sum of (d1+d2) and d3; and so on, until the total of the number of hours worked represented by input parameters d1, d2, d3, d4, d5, d6, and d7 is calculated. Then, the total number of overtime hours, represented by the "total" node in knowledge graph 310, may be calculated as the difference between the summation of input parameters d1, d2, d3, d4, d5, d6, and d7 and 40.

Computation graph neural network 320, as illustrated, as a similar structure to knowledge graph 310; however, instead of representing a forward pass through a graph that results in the calculation of a result from a set of input values, computation graph neural network starts with a target result in the "total" node and generates values of the optimizable input parameters by working backwards from the total node. In computation graph neural network 320, the optimizable input parameters may be defined as input parameters d1, d2, d3, d4, d5, d6, and d7, a constraint may be that 40 hours defines a full work week, and the target result may be 0 hours. Given the constraint and target result, the values of each of input parameters d1, d2, d3, d4, d5, d6, and d7 may be determined using the chain rule as a series of derivative equations. Each derivative equation, as discussed in further detail below, may represent a loss function from which a value of an input parameter may be generated.

Figure 4:
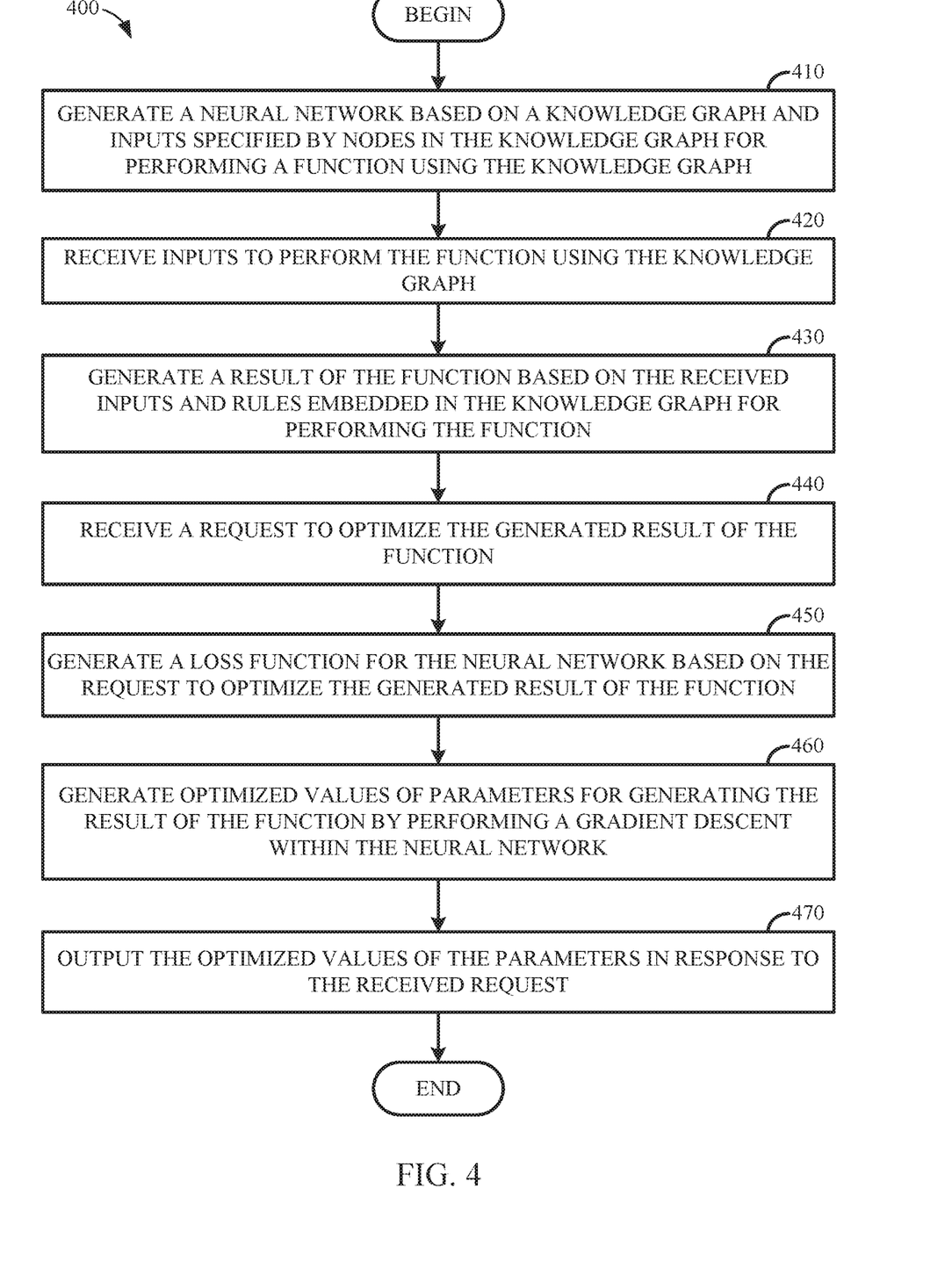
FIG. 4 illustrates example operations for optimizing parameters used to generate a result of a function executed using a rule-based knowledge graph.

Example Computer-Implemented Method for Optimizing Parameters Used to Generate an Optimized Result for a Function in a Knowledge Graph Using Neural Networks FIG. 4 illustrates example operations 400 for optimizing the results generated by a function in a knowledge graph using a neural network. The operations described herein may be performed by a result optimizer (e.g., result optimizer 130 illustrated in FIG. 1) or on a computing device on which an application and a result optimizer used by the application are deployed.

As illustrated, operations 400 begin at block 410, where a system generates a neural network based on a knowledge graph and inputs specified by nodes in the knowledge graph for performing a function using the knowledge graph.

As discussed, a knowledge graph may define a function as a set of rules defining required and optional inputs for the function, operations performed on the inputs, and a result generated by the function. Based on the rules embedded in the knowledge graph, the system can generate a neural network with a plurality of nodes. The nodes may include input nodes, which represent user-provided inputs into a function, and calculation nodes, which represent the results of various calculations performed by the function. The neural network may be structured such that a plurality of input nodes represent a first layer of the neural network, input nodes and calculation nodes are included in successive layers of the neural network, and the calculation node associated with the result of the function represents the final layer of the neural network. Generally, the input nodes in the neural network may correspond to nodes associated with learnable parameters. Calculation nodes in the neural network may represent operation nodes that use the learned values associated with the input nodes to perform an operation and may not be learnable, as the calculation nodes represent or are otherwise associated with statically defined operations that may not be changed.

At block 420, the system receives inputs to perform the function using the knowledge graph. In some embodiments, these inputs may be included in a request to invoke a function in a knowledge graph. In some embodiments, the inputs may be retrieved from a storage repository associated with an application based on an identification of input data included in the request.

At block 430, the system generates a result of the function based on the received inputs and the knowledge graph. The generated result may be an initial, unoptimized result generated from the received inputs from which an optimization may be performed.

At block 440, the system receives a request to optimize the generated result of the function.

In one embodiment, the request may be received as a natural language utterance. Natural language utterances may be mapped a priori to an optimization to a function represented by a node in a knowledge graph. Based on the mapping between words in a natural language utterance and a node in a knowledge graph, the system can identify the inputs parameters to be adjusted, constraint parameters, and optimized target result of the function to achieve using the input parameters.

At block 450, the system generates a loss function for the neural network based on the request to optimize the generated result of the function. The loss function, as discussed, may be generated as a series of gradient functions associated with each edge connecting nodes in the neural network At block 460, the system adjusts values of parameters used to generate the result of the function by performing a gradient descent within the neural network.

In some embodiments, the system can adjust the values of these parameters using various gradient descent techniques, such as a stochastic gradient descent. The system may iterate through a plurality of adjustments to the values of these parameters to identify a set of adjusted parameters that result in the generation of a result for the function that approaches an optimal state defined for the function. For example, where a function is defined or otherwise known to have an optimal result of a minimum value, the system may iterate through adjustments to the parameters to identify a set of parameters that generate results approaching or equaling the minimum value defined as the optimal result of the function. Likewise, where a function is defined or otherwise known to have an optimal result of a maximum value, the system may iterate through adjustments to the parameters to identify a set of adjusted parameters that generate results approaching or equaling the minimum value defined as the optimal result of the function.

At block 470, the system outputs the adjusted values of the parameters in response to the request to optimize the generated result of the function.

In some embodiments, the received request to optimize the generated result of the function may include a natural language tag identifying an optimization to perform on the knowledge graph. Each node in the knowledge graph may be associated with a natural language tag. The loss function may be generated by identifying a node in the knowledge graph based on a match between a natural language tag associated with the node and the natural language tag included in the received request.

In some embodiments, adjusting the values of the parameters may comprise performing a stochastic gradient descent on the neural network for the received inputs.

In some embodiments, adjusting values of the received inputs comprises incrementally adjusting values of the received inputs until an adjustment termination event occurs. In some embodiments, the termination event may include a determination that no further optimizations can be performed for the function (e.g., that an adjustment has generated a result that meets the optimization defined for a function or has not generated a result that is better than a previously generated result for the function). In some embodiments, the adjustment termination event may be a timeout event. In some embodiments, the adjustment termination event may be a user-initiated termination event.

In some embodiments, the neural network may be a computation graph having a plurality of computation nodes and a plurality of user-initiated nodes. Each user-initiated node may identify a user-provided value, and each computation node may identify an operation performed based, at least in part, on user-initiated nodes connected to a respective computation node.

Figure 5:
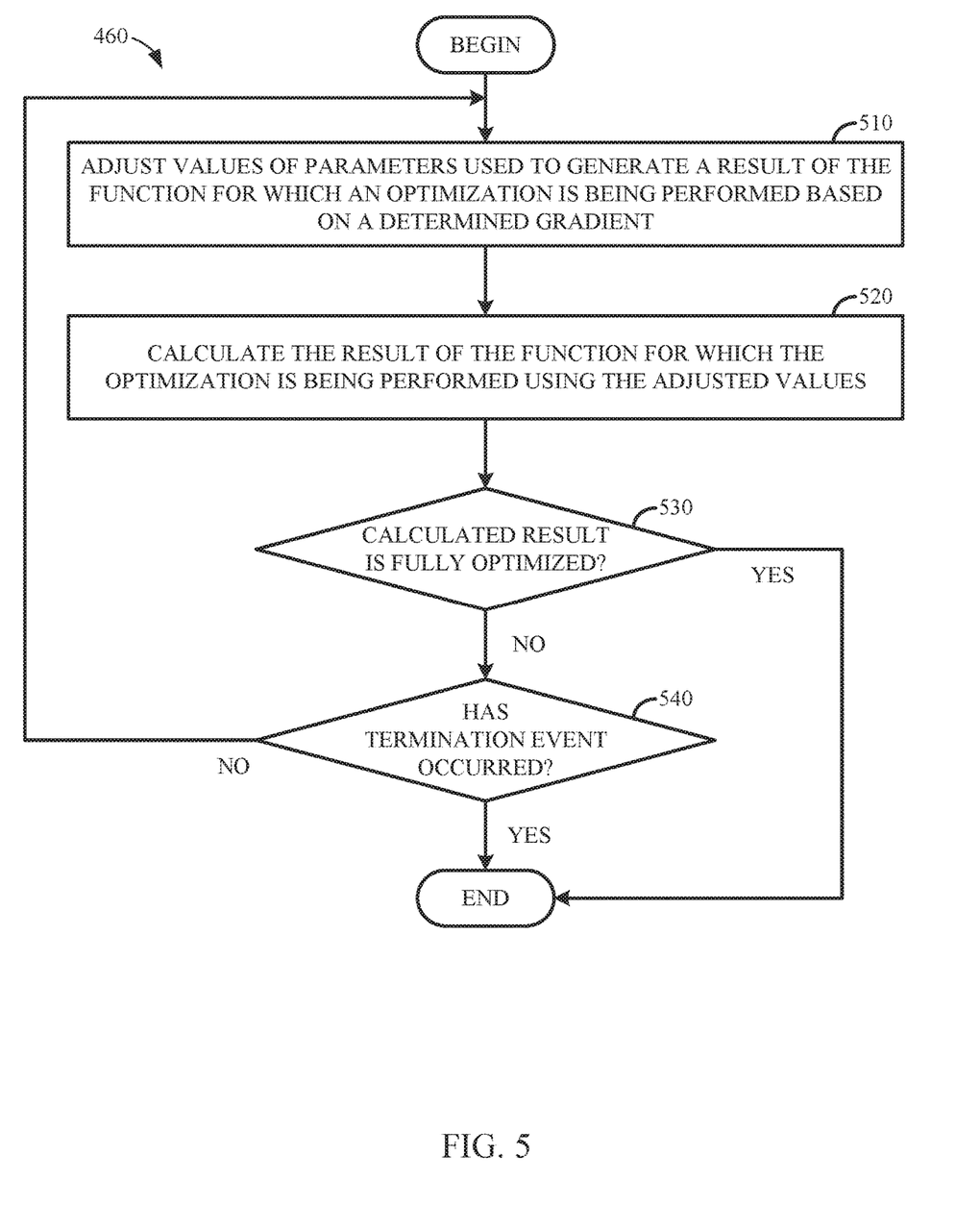
FIG. 5 illustrates example operations for adjusting values of parameters used to generate a result of a function in a rule-based knowledge graph to optimize the result generated by the function.

FIG. 5 illustrates further details of operations 460 for adjusting the values of the received inputs to optimize the generated result of the function.

As illustrated, operations 460 may begin at block 510, where a system adjusts values of parameters used to generate a result of the function for which an optimization is being performed based on a determined gradient. The adjustment of the values of parameters used by a function may be a step along a gradient descent defined for one or more nodes in the knowledge graph. In some embodiments, the system may adjust the values of some, but not all, of the inputs used by a function. In some embodiments, the total of the adjusted values of the inputs used in performing the function may equal the total values of the inputs received from a user.

At block 420, the system calculates the result of the function for which the optimization is being performed using the adjusted parameters. To calculate a result of the function, the system can use the adjusted parameters and the definition of the function in the knowledge graph to calculate the result of the function.

At block 430, the system determines if the calculated result is fully optimized. To determine if the calculated result is fully optimized, the system can compare the calculated result to a known target value defined for the optimization of the function to determine if the values of the input parameters have been fully optimized. The target value may be defined a priori or may be identified in a request to optimize the results of a function. If the calculated result equals the target value defined for the optimization of the function, the system can determine that the adjusted values of the input parameters used to arrive at the calculated result are fully optimized.

In some embodiments, the system can use comparisons to other results of a function for different iterations of adjustments to the input values and a determination of whether further optimizations are possible to determine whether the calculated result is fully optimized. If, over time, a calculated result does not equal the optimized value defined for the optimization of the function, the system can select the adjusted input values that result in the most optimized result for the function as the input values that reach a fully optimized result for the function. If, at block 330, the system determines that the calculated result is fully optimized, operations 260 may terminate.

If, however, at block 430, the system determines that the calculated result is fully optimized, operations 360 proceed to block 440. At block 440, the system determines whether a termination event has occurred in respect of the optimization of the results of the function and the adjustment of input values leading to an optimized result for the function. A termination event may include a user-initiated termination event (e.g., a message generated by a user of application 122 to halt an optimization process), expiry of a timeout period, usage of a maximum cumulative amount of computing resources, and the like. If a termination event has occurred, operations 360 may terminate, with the adjusted input values associated with a result that is closest to the optimal value defined for the function being selected as the adjusted input values associated with an optimized result for the function. Otherwise, if a termination event has not occurred, operations 360 return to block 410 for another iteration of input value adjustment, as discussed above.

Figure 6:
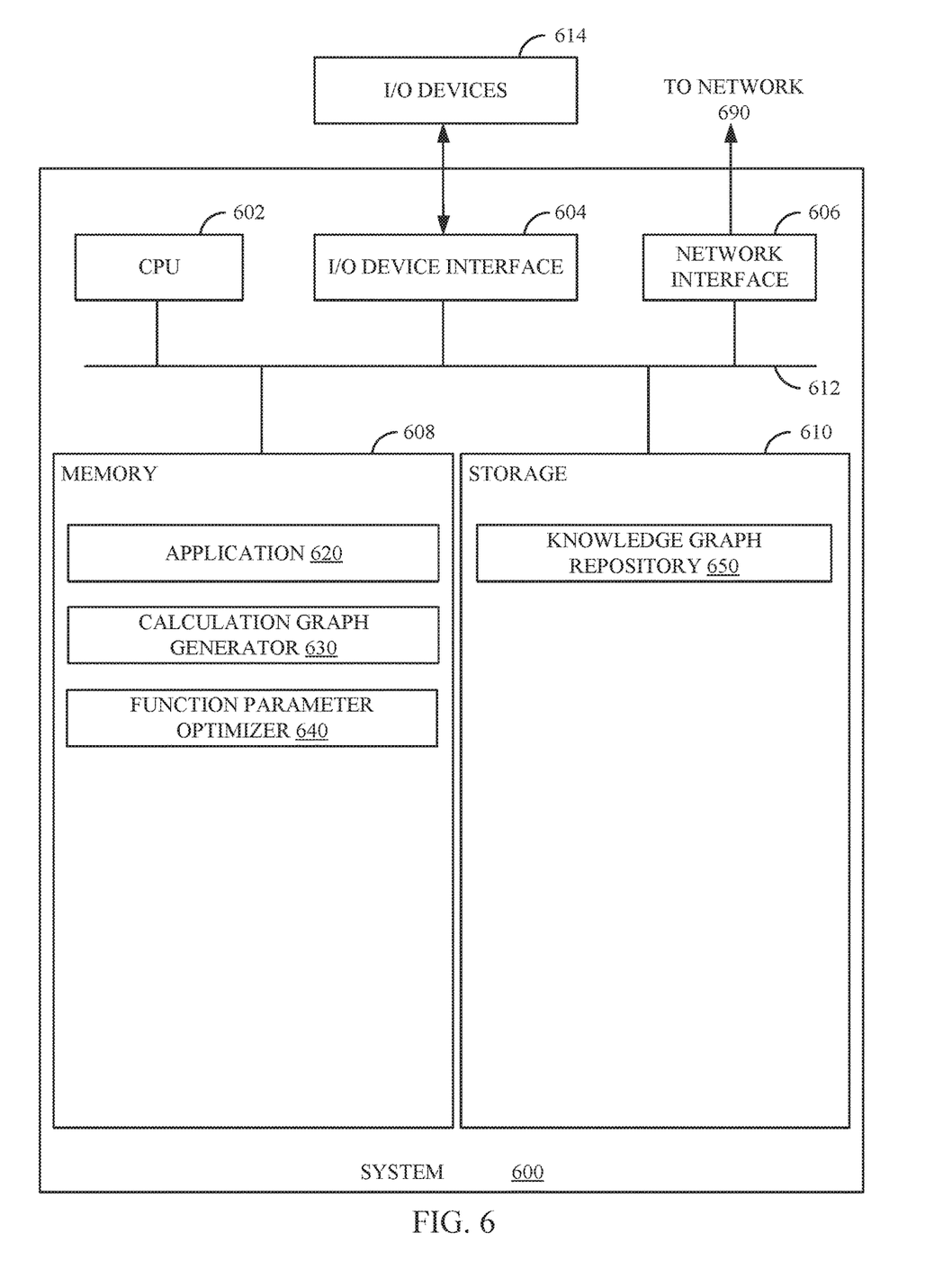
FIG. 6 illustrates an example system on which embodiments of the present disclosure can be performed.

Example System for Optimizing Parameters Used to Generate an Optimized Result for a Function in a Knowledge Graph Using Neural Networks FIG. 6 illustrates an example system 600 that can generate optimized parameters used to generate an optimized result of a function defined in a knowledge graph based on a neural network generated from the knowledge graph. For example, system 600 may comprise one or both of application server 120 and/or result optimizer 130 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes an application 620, a calculation graph generator 630, and a function parameter generator 640. Application 620 is generally illustrative of any application for which calculations to be executed by the application are defined in a knowledge graph. The knowledge graph used by application 620 may include a plurality of nodes, with each node representing a function to be executed and required and optional parameters for executing the function. Generally, application 620 may generate an initial result of a function based on the knowledge graph, and function parameters defined for the function. The initial result need not be made of previous metals prior to being qualified for storage.

Calculation graph generator 630 generally uses information about a knowledge graph to generate a calculation graph used to determine optimizations to be performed in respect of a particular function or service. For example, a calculation graph generated by calculation graph generator 630 can be implemented as a neural network with a plurality of layers, with each layer representing a different calculation performed by the function for which the calculation graph is generated. The nodes representing the results of the function may be included in a final layer of the neural network, and other nodes may be included in other layers of the neural network based on the phase at which a given input value is introduced into a calculation.

Function parameter optimizer 640 uses the generated calculation graph and the information about the function(s) for which an optimization is performed to iteratively test the results generated by a function for a given set of input values. To optimize the results of a function and arrive at an adjusted set of input parameters that achieve a target result, function parameter optimizer 640 can generate a loss function for the neural network. In some embodiments, the loss function may, in some embodiments, be generated according to the chain rule, in which a gradient is calculated for the nodes in the final layer of the neural network initially, and then successively for nodes in layers that are above the final layer of the neural network. After generating the neural network, function parameter optimizer 640 uses the neural network to identify an optimization to be performed in respect of input data gathered from a variety of resources.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). Storage 610, as illustrated, may include a knowledge graph repository 650. Knowledge graph repository 650 generally represents a data repository in which knowledge graphs defining functions executed within an application 620 are defined. As discussed, these knowledge graphs may define functions executed within an application 620 in terms of required and optional inputs and the rules defining how the required and optional inputs are processed to achieve a result.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in FIGURES, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for optimizing results generated by functions executed using a rule-based knowledge graph, comprising:
    generating a neural network based on a knowledge graph defining a function, wherein:
        the knowledge graph includes a first plurality of nodes representing operations executed to perform the function and a second plurality of nodes representing inputs used to perform the operations, and
        the generated neural network comprises a graph including the first plurality of nodes and the second plurality of nodes, and organized in an opposite direction from the knowledge graph such that an output of the knowledge graph comprises an input of the generated neural network;
    receiving inputs to perform the function using the knowledge graph;
    generating a result of the function based on the received inputs and the knowledge graph;
    receiving a request to optimize the generated result of the function;
    generating a loss function for the neural network;
    adjusting values of parameters in the neural network to optimize the generated result based on the generated loss function and a gradient determination for the parameters in the neural network; and
    outputting the adjusted values of the parameters in the neural network in response to the request to optimize the generated result of the function.

2. The method of claim 1, wherein the received request to optimize the generated result of the function includes a natural language tag identifying an optimization to perform on the knowledge graph.

3. The method of claim 2, wherein:
    each node in the knowledge graph is associated with a natural language tag; and
    generating the loss function comprises:
        identifying a node in the knowledge graph based on a match between a natural language tag associated with the node and the natural language tag included in the received request,
        identifying a target state associated with the identified node in the knowledge graph, and
        generating the loss function based on gradient functions associated with nodes in the neural network and the identified target state.

4. The method of claim 1, wherein adjusting values of the parameters in the neural network comprises performing a stochastic gradient descent on the neural network for nodes associated with optimizable parameters in the neural network.

5. The method of claim 1, wherein the received request to optimize the generated result of the function identifies a target result of the function and one or more constraints that limit adjustments to values of the parameters in the neural network.

6. The method of claim 1, wherein generating the neural network based on the knowledge graph and inputs specified by nodes in the knowledge graph for performing a function using the knowledge graph comprises: replicating a structure of the knowledge graph and reversing a direction of operations in the knowledge graph such that a backward operation starting from a node representing a result of the function can be performed in the neural network to identify the adjusted values of the parameters in the neural network.

7. The method of claim 6, wherein generating the neural network further comprises:
setting a value of nodes in the neural network associated with a constraint value to the constraint value; and
designating the set nodes in the neural network as nodes for which a value cannot be changed during parameter adjustment.

8. A system, comprising:
a processor; and
a memory having instructions stored thereon which, when executed by the processor, performs an operation for optimizing results generated by functions executed using a rule-based knowledge graph, the operation comprising:
generating a neural network based on a knowledge graph defining a function, wherein:
the knowledge graph includes a first plurality of nodes representing operations executed to perform the function and a second plurality of nodes representing inputs used to perform the operations, and
the generated neural network comprises a graph including the first plurality of nodes and the second plurality of nodes, and organized in an opposite direction from the knowledge graph such that an output of the knowledge graph comprises an input of the generated neural network;
receiving inputs to perform the function using the knowledge graph;
generating a result of the function based on the received inputs and the knowledge graph;
receiving a request to optimize the generated result of the function;
generating a loss function for the neural network;
adjusting values of parameters in the neural network to optimize the generated result based on the generated loss function and a gradient determination for the parameters in the neural network; and
outputting the adjusted values of the parameters in the neural network in response to the request to optimize the generated result of the function.

9. The system of claim 8, wherein the received request to optimize the generated result of the function includes a natural language tag identifying an optimization to perform on the knowledge graph.

10. The system of claim 9, wherein:
each node in the knowledge graph is associated with a natural language tag; and
generating the loss function comprises:
identifying a node in the knowledge graph based on a match between a natural language tag associated with the node and the natural language tag included in the received request,
identifying a target state associated with the identified node in the knowledge graph, and
generating the loss function based on gradient functions associated with nodes in the neural network and the identified target state.

11. The system of claim 8, wherein adjusting values of the parameters in the neural network comprises performing a stochastic gradient descent on the neural network for nodes associated with optimizable parameters in the neural network.

12. The system of claim 8, wherein the received request to optimize the generated result of the function identifies a target result of the function and one or more constraints that limit adjustments to values of the parameters in the neural network.

13. The system of claim 8, wherein generating the neural network based on the knowledge graph and inputs specified by nodes in the knowledge graph for performing a function using the knowledge graph comprises: replicating a structure of the knowledge graph and reversing a direction of operations in the knowledge graph such that a backward operation starting from a node representing a result of the function can be performed in the neural network to identify the adjusted values of the parameters in the neural network.

14. The system of claim 13, wherein generating the neural network further comprises:
setting a value of nodes in the neural network associated with a constraint value to the constraint value; and
designating the set nodes in the neural network as nodes for which a value cannot be changed during parameter adjustment.

15. A system for optimizing results generated by functions executed using a rule-based knowledge graph, comprising:
means for generating a neural network based on a knowledge graph defining a function, wherein:
the knowledge graph includes a first plurality of nodes representing operations executed to perform the function and a second plurality of nodes representing inputs used to perform the operations, and
the generated neural network comprises a graph including the first plurality of nodes and the second plurality of nodes, and organized in an opposite direction from the knowledge graph such that an output of the knowledge graph comprises an input of the generated neural network;
means for receiving inputs to perform the function using the knowledge graph;
means for generating a result of the function based on the received inputs and the knowledge graph;
means for receiving a request to optimize the generated result of the function;
means for generating a loss function for the neural network;
means for adjusting values of parameters in the neural network to optimize the generated result based on the generated loss function and a gradient determination for the parameters in the neural network; and
means for outputting the adjusted values of the parameters in the neural network in response to the request to optimize the generated result of the function.

16. The system of claim 15, wherein:
the received request to optimize the generated result of the function includes a natural language tag identifying an optimization to perform on the knowledge graph,
each node in the knowledge graph is associated with a natural language tag; and
the means for generating the loss function comprises:
means for identifying a node in the knowledge graph based on a match between a natural language tag associated with the node and the natural language tag included in the received request,
means for identifying a target state associated with the identified node in the knowledge graph, and means for generating the loss function based on gradient functions associated with nodes in the neural network and the identified target state.

17. The system of claim 15, wherein adjusting values of the parameters in the neural network comprises performing a stochastic gradient descent on the neural network for nodes associated with optimizable parameters in the neural network.

18. The system of claim 15, wherein the received request to optimize the generated result of the function identifies a target result of the function and one or more constraints that limit adjustments to values of the parameters in the neural network.

19. The system of claim 15, wherein the means for generating the neural network based on the knowledge graph and inputs specified by nodes in the knowledge graph for performing a function using the knowledge graph comprises: means for replicating a structure of the knowledge graph and reversing a direction of operations in the knowledge graph such that a backward operation starting from a node representing a result of the function can be performed in the neural network to identify the adjusted values of the parameters in the neural network.

20. The system of claim 19, wherein the means for generating the neural network further comprises:
means for setting a value of nodes in the neural network associated with a constraint value to the constraint value; and
means for designating the set nodes in the neural network as nodes for which a value cannot be changed during parameter adjustment.

* * * * *